2 Sheets—Sheet 1.

T. J. EDDY.
Car Wheel.

No. 8,255. Patented July 29, 1851.

T. J. EDDY.
Car Wheel.

No. 8,255.

2 Sheets—Sheet 2.

Patented July 29, 1851.

UNITED STATES PATENT OFFICE.

THOS. J. EDDY, OF WATERFORD, NEW YORK.

CAST-IRON CAR-WHEEL.

Specification of Letters Patent No. 8,255, dated July 29, 1851.

*To all whom it may concern:*

Be it known that I, THOMAS J. EDDY, of Waterford, in the county of Saratoga and State of New York, have invented certain new and useful Improvements in Wheels for Railroad Cars, Locomotives, and other Purposes, of which the following is a full, clear, and exact description, reference being had to the accompanying drawing, which forms part of this specification and in which—

Figure 1:
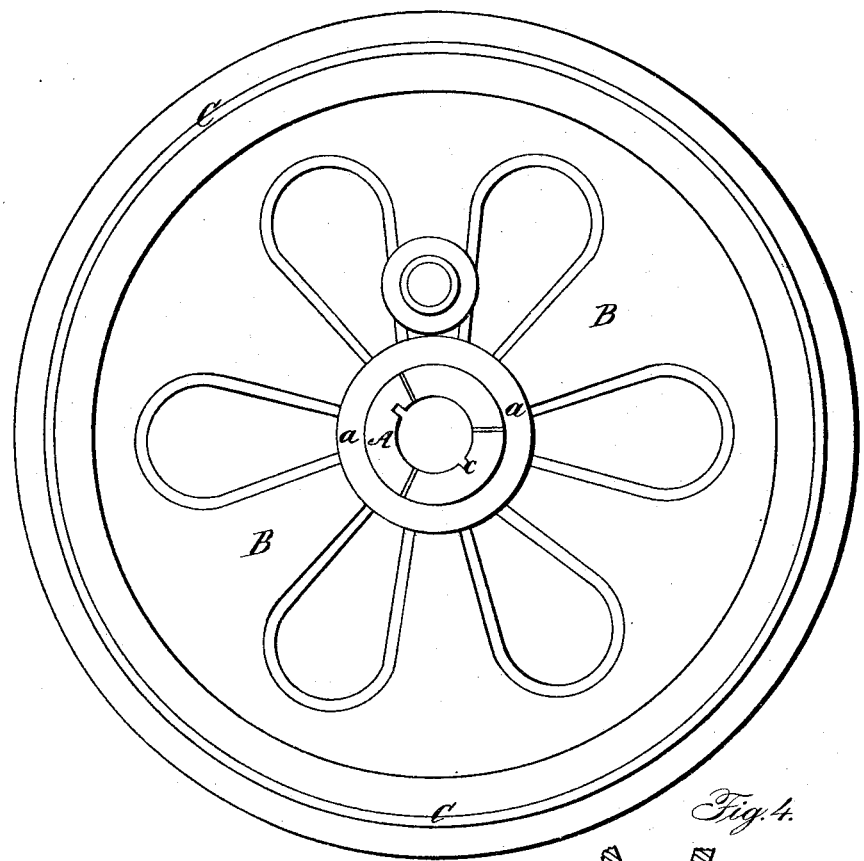
Figure 4:
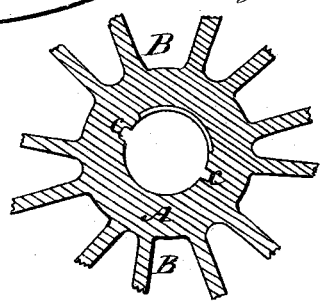
Figure 3:
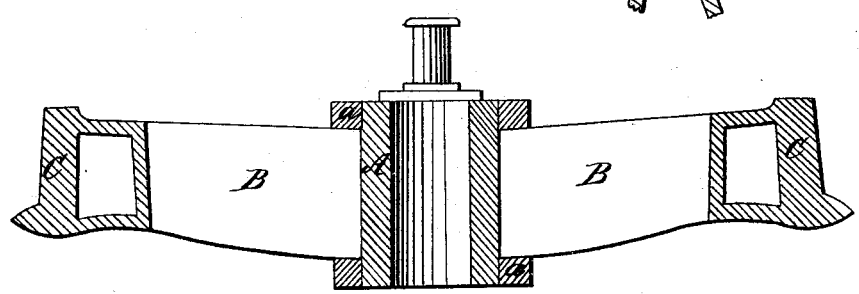
Figure 2:
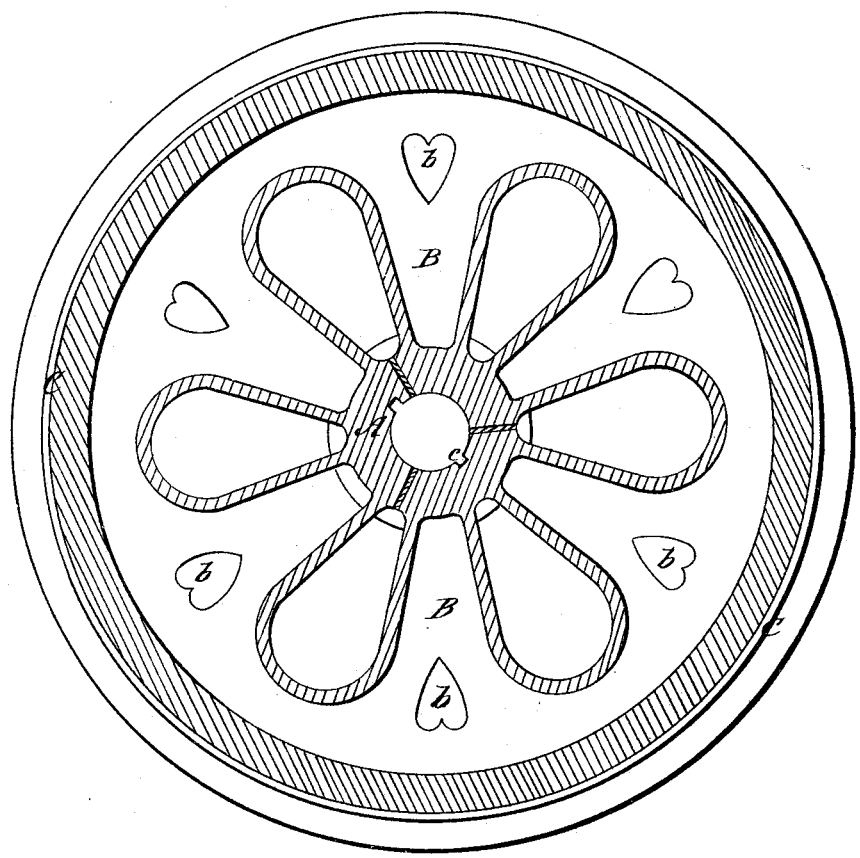
Figure 5:
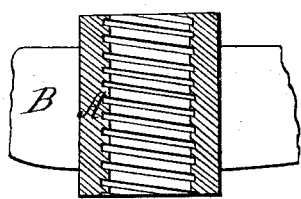
Figure 6:
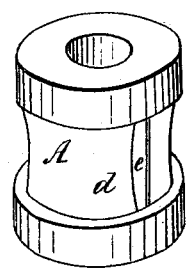
Figure 7:
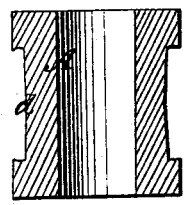

Figure 1 represents an elevation of my Excelsior car-wheel. Fig. 2 is a section of the same at right angles to the shaft. Fig. 3 is a section through the axis of the wheel. Figs. 4 and 5 are two sections of fragments of a car wheel showing my method of securing it to its shaft. Fig. 6 is a view in perspective and Fig. 7 a section of my improved hub.

My improvements consist first in a combination of a hollow rim with a hollow spoke made of either cast or wrought iron by which combination the strength of the wheel is increased with the same weight of metal while the risk of breakage in cast wheels by unequal cooling after casting, is diminished; second in a method of attaching a car or driving wheel to its shaft by screwing it upon the latter and fixing it in its position by a key.

The third portion of my invention consists in a method of forming the hub separate from the rim and spokes, and then casting the latter upon the former.

The wheel represented in the accompanying drawing is the driving wheel of a locomotive. It is composed mainly of the hub A, the spokes B and the rim C. The hub in this example is of the split variety, it is cast with the rim and spokes and is hooped by bands *a a*. The rim is hollow as shown at Figs. 2 and 3 and the spokes B are also hollow, this is effected by the introduction of a core into the mold, round which the metal flows, filling the spaces included between the core and the mold Suitable vents are formed within the core which form openings *b* in the inner face of the wheel and allow the gases evolved in casting to escape freely from the core.

In order to attach a car or driving wheel securely to its shaft I cut a screw in the hub as shown in Figs. 4 and 5 and a corresponding screw upon the end of the shaft to which the wheel is to be fitted. The wheel is then screwed upon the shaft and is fixed in its position by keys which are inserted in key-seats *c, c*, in the ordinary manner. This method of securing the wheel to its shaft not only adds to the security of the passengers, as it prevents the wheel from working off even if the keys should jar out, but it is also of advantage in permitting the substitution of a new for a broken wheel without taking the shaft to the machine shop. In the ordinary method of securing wheels to their shafts the latter are turned off, and the hubs are bored to fit the shafts so tightly that it is necessary to force the wheels on to their shafts by a screw vise, and as the latter is a ponderous machine it cannot easily be carried to the place where the new wheel is to be applied. This difficulty is obviated by my improvement, as car-wheels fitted in this manner can be screwed into or off from their shafts by means of simple tools as the wheels themselves form levers to which the power can be applied.

In the foregoing description I have supposed that the hub is cast with the rim and spokes, but I prefer to construct it separately from the latter and then to insert it in the wheel mold and cast the rim and spokes upon it. In order to effect a perfect joining of the spokes to the hub I turn the latter in a lathe to the form shown at Figs. 6 and 7. By this operation the other coating of sand and scale is removed from the hub and the groove *d* in its barrel is beveled in both directions toward the middle of the hub, the shoulders of the groove are also beveled inward in such manner that the width of the groove at its bottom shall be greater than its width at the periphery of the hub. In order to increase the adhesion of the spokes I also ship flutes as at *e* in the bottom of the groove. By this manner of preparing the hub, the melted metal comes in contact with clean surfaces and adheres firmly to the hub while the iron at the inner ends of the spokes entering the dovetailed groove securely anchors them to the hub. This method of forming the hub separate from the spokes and rim also enables me to make my wheels with solid in place of split hubs, while at the same time as the iron which forms the spokes comes in contact with the cold hub it is chilled and thus cools faster than it otherwise would; this is of great advantage in casting chilled wheels in which, when the hub is cast with the rim and spokes, the metal which forms the rim, being in contact with the chill cools faster than that which forms the spokes and hub and as the latter contacts subsequently the spokes are frequently broken. The advantages resulting from this separate hub are of great value in car wheels but are of especial value in manumacturing driving wheels for locomotives which may be cast in this manner with chilled rims.

When my improvements are applied to the driving wheels of locomotives with outside connections a hub to support the crank pin must be cast solid with the wheel upon one or between two spokes.

The first portion of my invention is applicable to cast wheels for railroads with either split or solid hubs cast fast to the spokes and rim, or to those in which the rim and spokes are cast upon a separate hub; it is also applicable to iron wheels either cast or wrought for other purposes. The second portion of my invention is also applicable to car and driving wheels of all descriptions, whether made in other respects according to the directions herein laid down or in any other manner. And lastly the casting of the rim and spokes upon a separate hub is applicable to wheels with solid or hollow spokes or rims.

What I claim as my invention and desire to secure by Letters Patent is—

1. A cast-iron car wheel made with a hollow chilled rim and hollow spokes in the manner and form herein set forth.

2. The method of forming wheels for railroad cars by casting the rim and spokes upon a grooved hub which has been formed separately as herein described.

In testimony whereof I have hereunto subscribed my name.

THOS. J. EDDY.

Witnesses:
W. T. SEYMOUR,
G. W. KIRTLAND.